United States Patent [19]
Koshiyouji

[11] Patent Number: 5,777,982
[45] Date of Patent: Jul. 7, 1998

[54] DISK CARTRIDGE HAVING A PARTICULAR BELT AND SLIDER CONFIGURATION

[75] Inventor: Takashi Koshiyouji, Yokohama, Japan

[73] Assignee: Kabushiki Kaisha Toshiba, Kawasaki, Japan

[21] Appl. No.: 626,366

[22] Filed: Apr. 2, 1996

[30] Foreign Application Priority Data

Apr. 28, 1995 [JP] Japan .................................. 7-106239

[51] Int. Cl.[6] .................................................. G11B 23/03
[52] U.S. Cl. ......................................... 369/291; 360/133
[58] Field of Search ..................... 360/133; 369/290–292

[56] References Cited

U.S. PATENT DOCUMENTS

| | | | |
|---|---|---|---|
| 5,073,889 | 12/1991 | Rayner | 360/133 |
| 5,091,901 | 2/1992 | Yamamoto et al. | 360/133 |
| 5,121,279 | 6/1992 | Saeki et al. | 360/133 |
| 5,150,269 | 9/1992 | Iwaka et al. | 360/133 |
| 5,166,922 | 11/1992 | Akiyama et al. | 360/133 |
| 5,249,177 | 9/1993 | Kamakura et al. | 369/291 |
| 5,367,422 | 11/1994 | Fujisawa et al. | 360/133 |
| 5,515,358 | 5/1996 | Goto | 360/133 |
| 5,539,600 | 7/1996 | Lee et al. | 360/291 |

FOREIGN PATENT DOCUMENTS

| | | |
|---|---|---|
| 0164647 A1 | 12/1985 | European Pat. Off. |
| 0202655 A2 | 11/1986 | European Pat. Off. |
| 0339651 A2 | 11/1989 | European Pat. Off. |
| 0393858 A1 | 10/1990 | European Pat. Off. |
| 0440175 A2 | 8/1991 | European Pat. Off. |
| 0442502 A2 | 8/1991 | European Pat. Off. |
| 0174651 A2 | 3/1996 | European Pat. Off. |
| 5-174530 | 7/1993 | Japan ................................ 360/133 |
| 5-342795 | 12/1993 | Japan ................................ 360/133 |
| 06267226 | 9/1994 | Japan . |

*Primary Examiner*—Craig A. Renner
*Assistant Examiner*—Brian E. Miller
*Attorney, Agent, or Firm*—Cushman Darby & Cushman IP Group of Pillsbury Madison & Sutro LLP

[57] ABSTRACT

A case of a disk cartridge contains a disk an optical disk therein and includes an opening portion for exposing part of the optical disk. A shutter for opening/closing the opening portion is slidably attached to the case. A slider movably provided on one side of the case is connected to the shutter, and an urging member for closing shutter is connected to the slider. A belt for pulling the slider is slidably mounted on the case and connected to the slider. The slider includes a connecting portion to which an end portion of the urging member is connected. The connecting portion has an inserting hole into which the end portion of the urging member is inserted, an engagement portion engaged with the end portion of the urging member inserted into the inserting hole, for inhibiting the urging member from coming out of the inserting hole, and a positioning portion for positioning the end portion of the urging member in the inserting hole when the end portion of the urging member is inserted into the inserting hole.

7 Claims, 15 Drawing Sheets

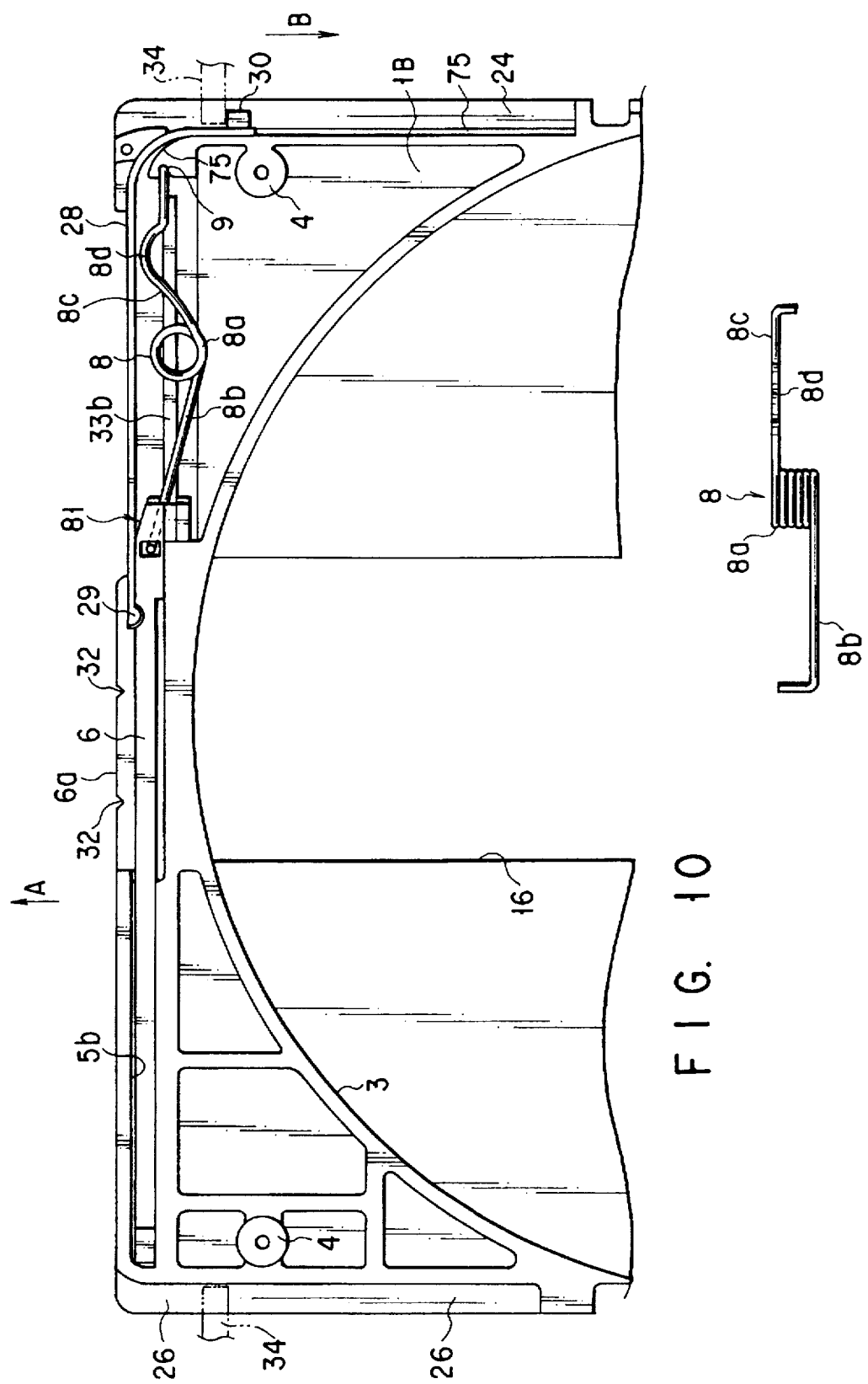
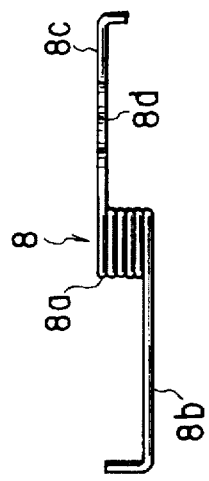
FIG. 10
FIG. 11

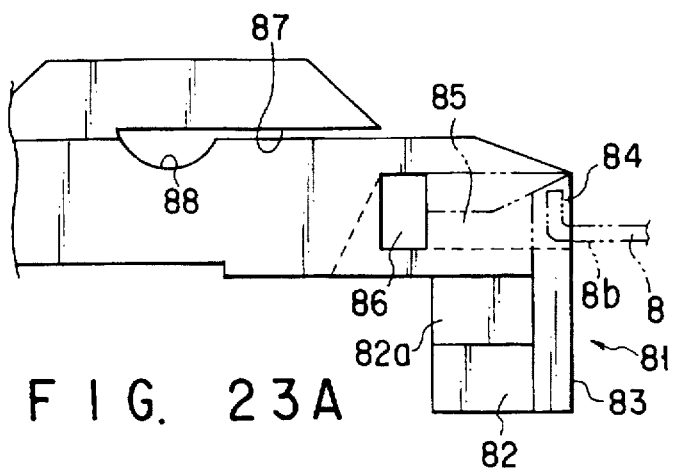
FIG. 23A
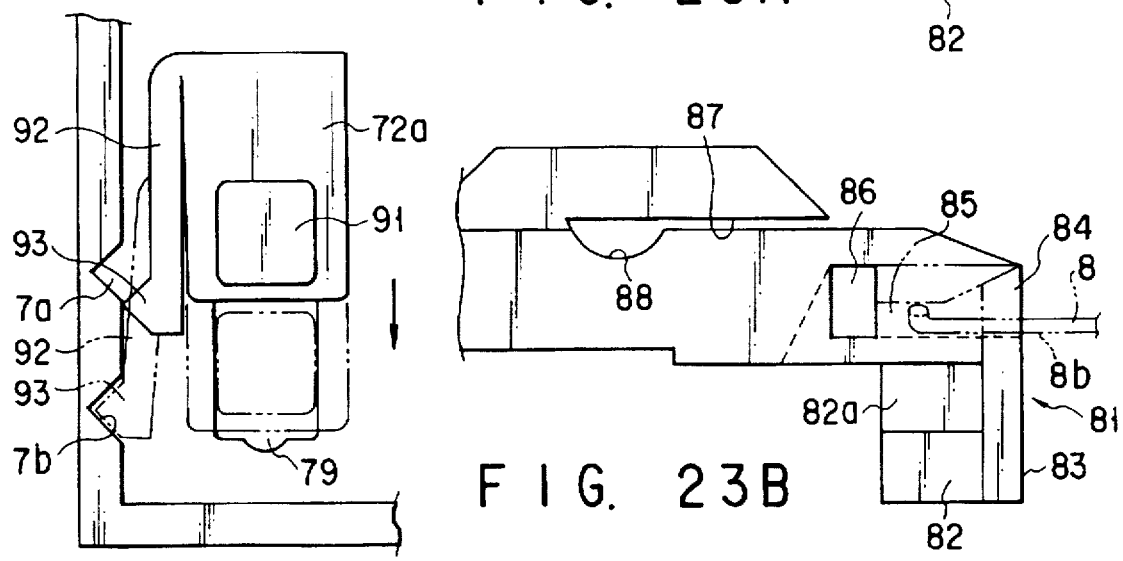
FIG. 20
FIG. 23B
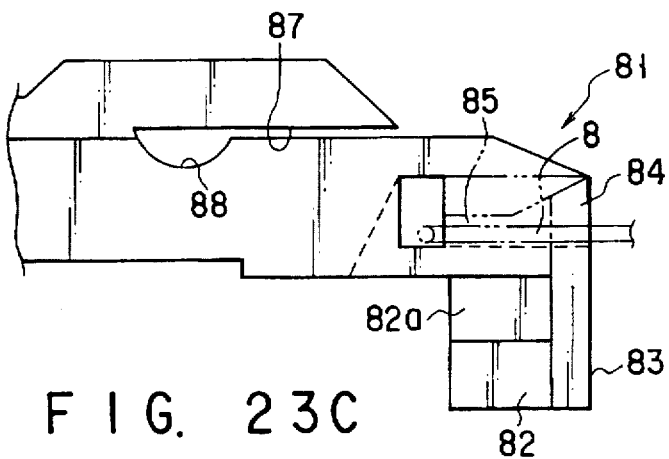
FIG. 23C

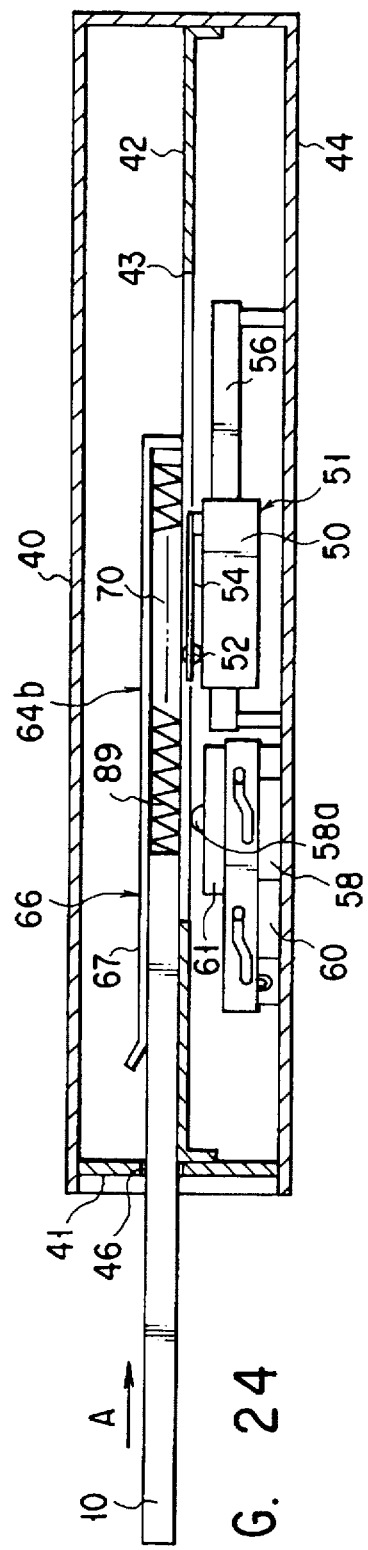
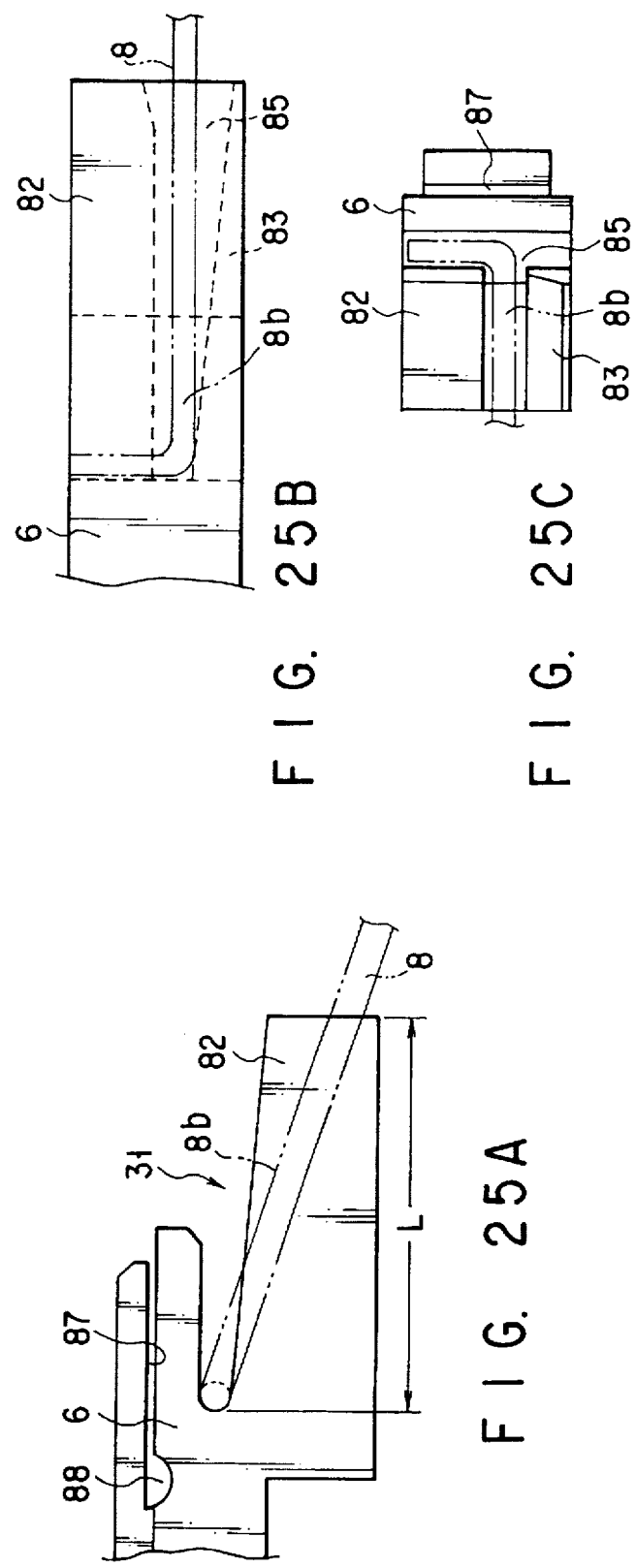
FIG. 24
FIG. 25B
FIG. 25C
FIG. 25A

DISK CARTRIDGE HAVING A PARTICULAR BELT AND SLIDER CONFIGURATION

BACKGROUND OF THE INVENTION

1. Field of the Invention

This invention relates to a disk cartridge housing an optical disk serving as a recording medium.

2. Description of the Related Art

A 90 mm optical disk of a magneto-optic (MO) recording type has recently been popularized as a large-capacity memory medium in place of a floppy disk. As the same type of 90 mm rewritable optical disk, a photo-crystallization (PC) type optical disk both sides of which can be used and which can greatly be increased in memory capacity, and an optical disk drive having such an optical disk, have been developed.

The basic features of the PC type optical disk, such as length and width measures, are the same as those of the 90 mm MO type optical disk, but the PC type disk is stored in its original cartridge featured mainly in thickness size and shutter opening/closing mechanism.

A disk cartridge usually includes a pair of symmetrical half shells abutting and screwed on each other, an optical disk and a shutter spring contained in the half shells, and a shutter opening/closing mechanism.

The shutter opening/closing mechanism of a cartridge for the MO type optical disk is operated in association with a rotating lever provided at a disk drive, whereas a cartridge for the PC type optical disk has a belt which is operated in interlock with the opening and closing of a shutter, and the end of the belt is pulled against the urging force of a shutter spring by inserting the cartridge into the disk drive, thereby opening and closing the shutter.

As for the cartridge for the MO type optical disk, an opening is formed opposite to a shutter spring and used as an insertion opening through which the shutter spring is inserted when the cartridge is assembled. The shutter spring is so elaborated that it can be set in a predetermined position within the cartridge only by being inserted into the insertion opening after the half shells are opposed to and screwed on each other.

In contrast, as for the cartridge for the PC type optical disk, the belt extends from the shutter toward the side of the cartridge and structurally covers the shutter spring, so that a portion corresponding to the insertion opening of the cartridge for the MO type disk is covered with the belt. It is thus necessary to insert the shutter spring before the half shells are screwed on each other, unlike in the case of the cartridge for the MO type disk.

More specifically, one end of the shutter spring is attached to a fixed portion of the cartridge and the other end thereof is attached to a shutter slider for defining a parallel operation of the shutter immediately before the half shells are placed one on another at the final stage of the assembly.

However, conventionally, the connection of the shutter spring to the shutter slider is structurally difficult, as is the automatic assembly for the cartridge photo-crystallization type disk.

SUMMARY OF THE INVENTION

The present invention has been developed in consideration of the above circumstances and its object is to provide a disk cartridge suitable for automatic assembly.

To attain the above object, a disk cartridge according to the present invention comprises: a case containing an optical disk and designed to be inserted into an optical disk drive, the case including an opening portion for exposing part of the optical disk; a shutter slidably attached to the case, for opening/closing the opening portion; a slider movably provided on one side of the case and connected to the shutter; an urging member connected to the slider, for urging the slider in which direction the shutter is closed; and a belt having an end portion connected to the slider and slidably mounted on the case, for pulling the slider against an urging force of the urging member to open the shutter in accordance with an operation of inserting the case into the optical disk drive. The slider includes a connecting portion to which an end portion of the urging member is connected, and the connecting portion has an inserting hole into which the end portion of the urging member is inserted, an engagement portion engaged with the end portion of the urging member inserted into the inserting hole, for inhibiting the urging member from coming out of the inserting hole, and a positioning portion for positioning the end portion of the urging member in the inserting hole when the end portion of the urging member is inserted into the inserting hole.

According to the disk cartridge so constructed, upon assembling the disk cartridge, one end of the urging member is brought into contact with the positioning portion of the slider so as to be positioned with respect to the inserting hole, and then pushed into the inserting hole. Only by these operations, the urging member can be connected to the slider.

In the present invention, the slider includes a guide portion for inhibiting the urging member from rising when the urging member moves in a direction opposite to the urging force thereof in accordance with an opening operation of the shutter. Thus, the urging member can be prevented from coming out of the slider, and the slider can be moved smoothly.

The urging member is provided at its halfway point with a deformed portion which is curved so as to prevent the urging member from abutting a fixing portion of the case when the urging member is moved in a direction opposite to the urging force in accordance with the opening operation of the shutter. Thus, the urging member can be moved smoothly and the shutter can be opened reliably.

A disk cartridge according to the present invention comprises: a case designed to be inserted into an optical disk drive and containing an optical disk both sides of which are capable of recording and reproduction, the case including first and second half cases connected to each other and each having an opening portion for exposing part of the optical disk; a shutter slidably attached to the case, for opening/closing the opening portion; a slider movably provided on one side of the case and connected to the shutter; an urging member connected to the slider, for urging the slider in which direction the shutter is closed; a belt having an end portion connected to the slider and slidably mounted on the case, for pulling the slider against an urging force of the urging member to open the shutter in accordance with an operation of inserting the case into the optical disk drive; a first operation piece provided between the first and second half cases and arranged movably between a write protect position where information is inhibited from being written to one of the sides of the optical disk and a write position where information is allowed to be written to the one of the sides of the optical disk; and a second operation piece provided between the first and second half cases and arranged movably between a write protect position where information is inhibited from being written to the other side of the optical disk and a write position where information is allowed to be written to the other side of the optical disk.

With the optical disk drive having the above constitution, since two independent operation pieces are provided for the respective sides of the optical disk, a user is able to operate the operation pieces corresponding to the respective sides of the optical disk without confusion. Since the position of the operation pieces on the user side and that of the operation pieces on the disk drive side coincide with each other, the sensor of the disk drive can be convertible.

The slider has an engagement recess extending substantially perpendicularly to a moving direction of the slider, and the end portion of the belt has a projection engaged in the engagement recess. Therefore, the slider and belt can easily be connected to each other, thus allowing automatic assembly.

The case has a stopper portion for abutting the shutter when the shutter is closed, and an inclined face for defining one side edge of the opening portion of the shutter and guiding the shutter to the stopper portion. Therefore, when the shutter is closed, it smoothly moves to the stopper portion along the inclined face without being caught by the side edge of the opening portion, with the result that shutter can reliably be opened and closed.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIGS. 1 to 23C illustrate a disk cartridge according to one embodiment of the present invention, in which:

FIG. 1 is a perspective view of the disk cartridge whose shutter is closed;

FIG. 2 is a perspective view of the disk cartridge whose shutter is opened;

FIG. 3 is a plan view of the disk cartridge;

FIG. 4 is an exploded perspective view of the disk cartridge;

FIG. 5 is a plan view showing the surface of a first half case constituting the disk cartridge;

FIG. 6 is a plan view showing the back of the first half case;

FIG. 7 is a plan view showing the surface of a second half case constituting the disk cartridge;

FIG. 8 is a plan view showing the back of the second half case;

FIG. 9 is an enlarged plan view of part of the back of the second half case;

FIG. 10 is a plan view showing the second half case to which a slider, a torsion spring and a belt are attached;

FIG. 11 is a side view of the torsion spring;

FIG. 12 is a perspective view showing a connecting portion of the slider and one end of the belt;

FIG. 13 is a plan view of the connecting portion;

FIG. 14 is a front view of the connecting portion;

FIG. 15 is a plan view corresponding to FIG. 10 and showing the second half case in which the slider shifts in the shutter opening direction;

FIG. 16 is a perspective view of an operation piece;

FIG. 17 is a side view of the operation piece;

FIG. 18 is a plan view showing mounting holes of the surface of the first half case;

FIG. 19 is a plan view showing mounting holes of the back of the first half case;

FIG. 20 is a plan view showing the operation state of the operation piece;

FIG. 21 is a plan view showing mounting holes of the surface of the second half case; and FIG. 22 is a plan view showing mounting holes of the back of the second half case, and FIGS. 23A to 23C are plan views showing a process of connecting the torsion spring to the connection portion of the slider;

FIG. 24 is a cross-sectional view of a disk drive into which the disk cartridge is to be loaded;

FIGS. 25A to 25C are plan, side and front views showing a modification of the connecting portion of the slider;

DETAILED DESCRIPTION OF THE PREFERRED EMBODIMENTS

An embodiment of the present invention will now be described in detail with reference to the accompanying drawings.

Figure 1:
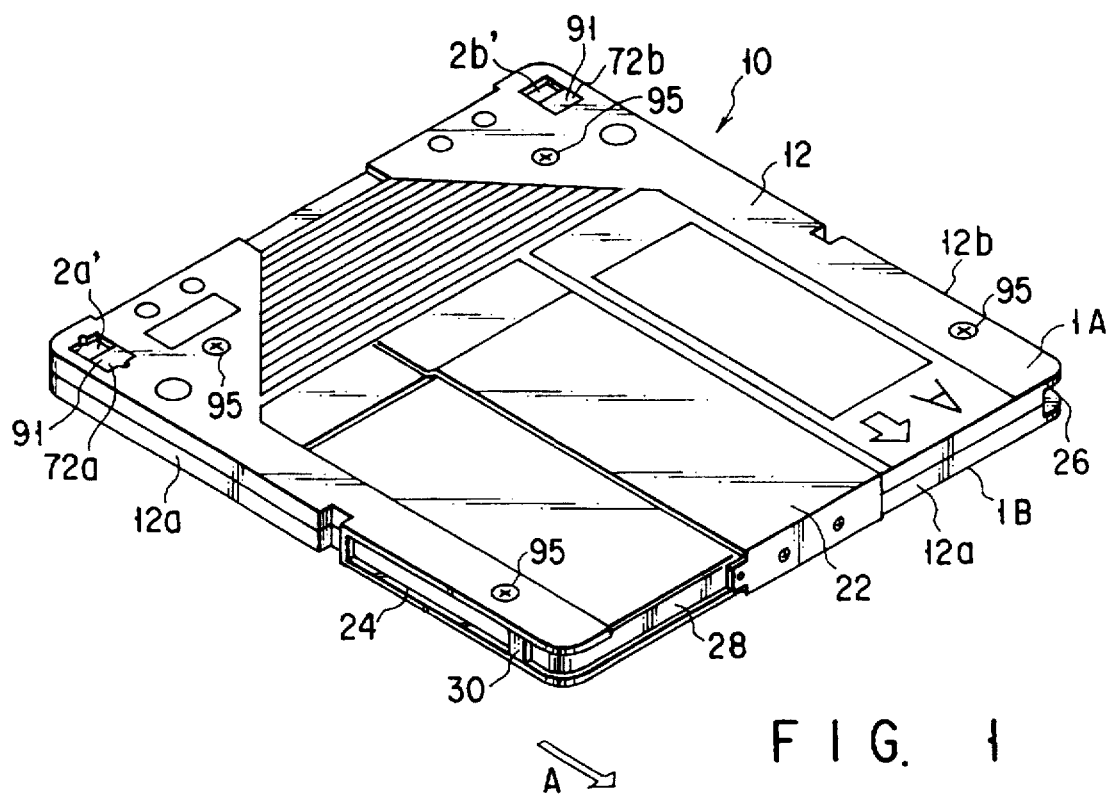
Figure 2:
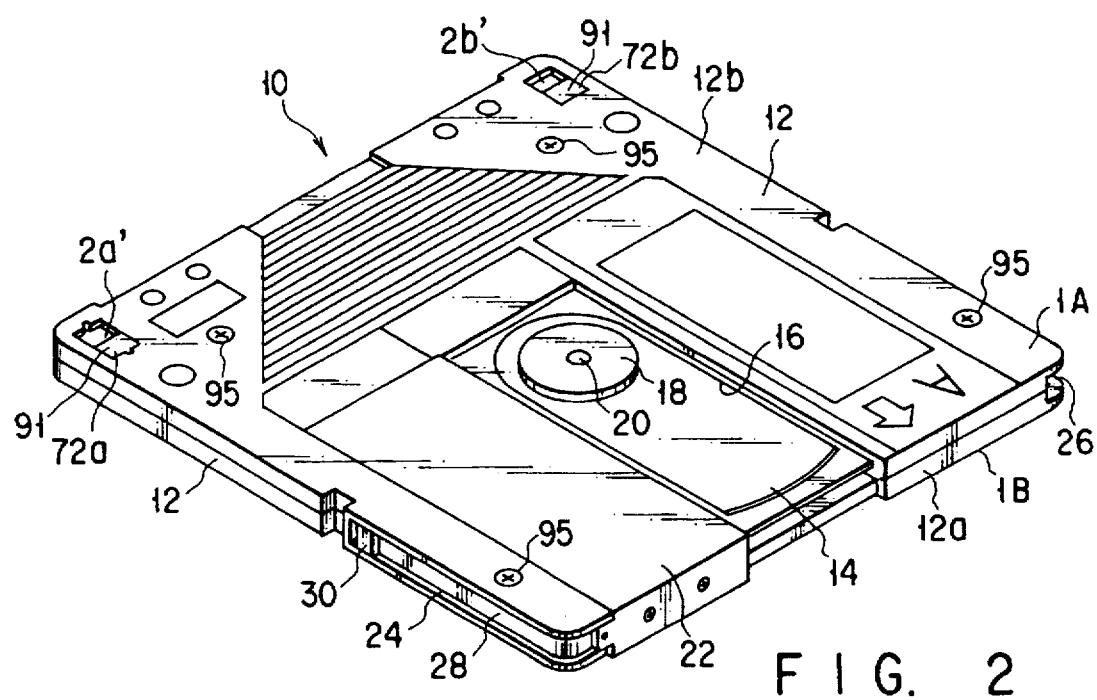
Figure 3:
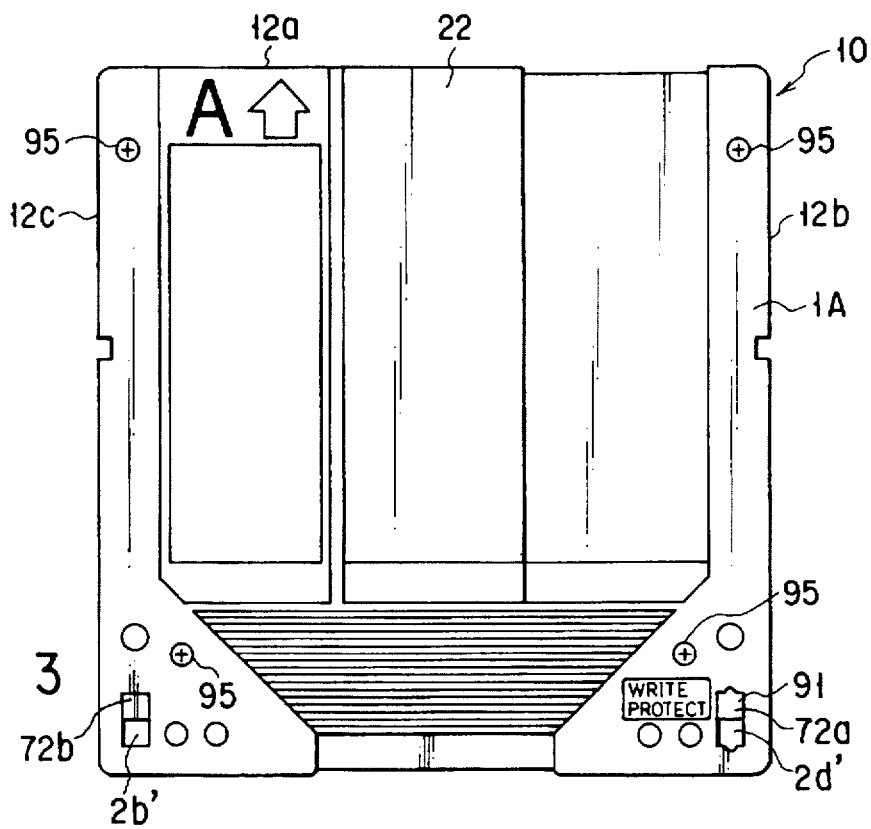

As illustrated in FIGS. 1 to 3, a disk cartridge 10 includes a flat, rectangular case 12 storing an optical disk 14 as an information recording medium. Information can be recorded on and reproduced from both sides of the optical disk 14. The case 12 is constituted by detachably connecting first and second half cases 1A and 1B, which are substantially symmetrical with each other, by means of a plurality of screws 95.

An opening portion 16 for access to the optical disk 14 is formed in each of the upper and lower surfaces of the case 12. Each of the opening portion 16 extends from almost the central part of the case 12 to the vicinity of a front end face 12a of the case 12 in the inserting direction A of the disk cartridge 10.

A hub 18 with a central hole 20 is attached to the central part of the optical disk 14. The hub 18 and part of each side of the optical disk are exposed outside of the case 12 through the opening portions 16.

The case 12 is provided with a shutter 22 for opening and closing the opening portions 16, which is slidably attached onto both sides of the case 12 as one component. More specifically, the shutter 22, which has a U-shaped cross section, is fitted to the case 12 from the front end side thereof so as to sandwich the case 12. The shutter 22 can thus slide between its closing position, shown in FIG. 1, and its opening position, shown in FIG. 2, in a direction parallel to the front end face 12a. As will be described later, the shutter 22 is attached to a slider 6 arranged in the case 12 and always urged toward the closing position by a torsion spring 8 through the slider.

A groove 24 is formed on the front end face 12a and side face 12b of the case 12, which is located alongside the opening position of the shutter, in such a manner that it extends from near to the opening portions 16 to the middle of the side face 12b. In the groove 24 are arranged a sliding pin 30 slidable along the groove and a belt 28 coupling the sliding pin 30 and shutter 22 together. In this embodiment, the sliding pin 30 and belt 28 are formed integrally as one component by resin. Therefore, by causing the sliding pin 30 to slide in a direction opposite to the inserting direction A, the shutter 22 is pulled through the belt 28 and slider 6 and moved to the opening position.

A groove 26 is formed on the opposite side face 12b of the case 12 such that it extends from the middle of the side face 12b to the front end of the case.

Figure 5:
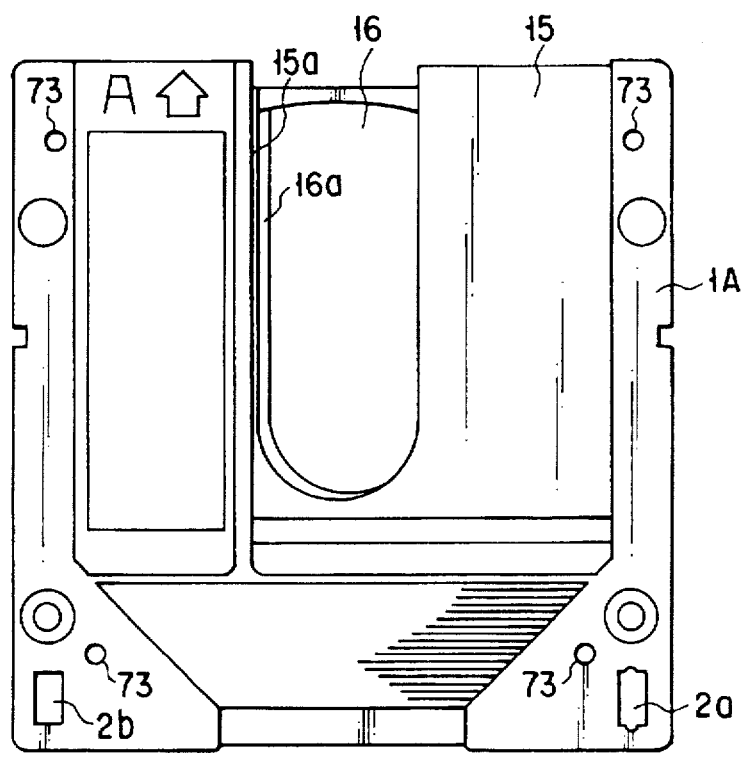
Figure 4:
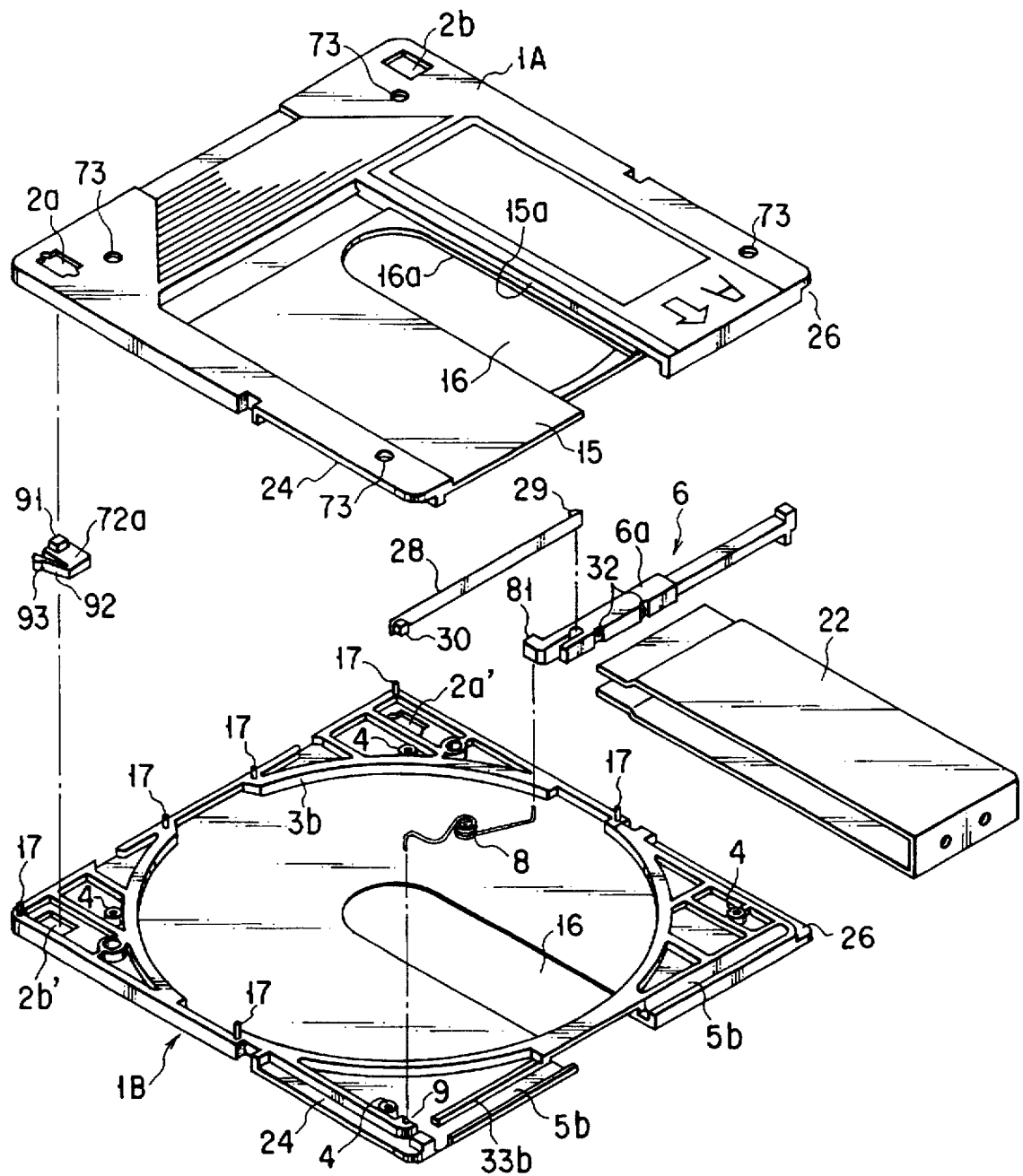
Figure 6:
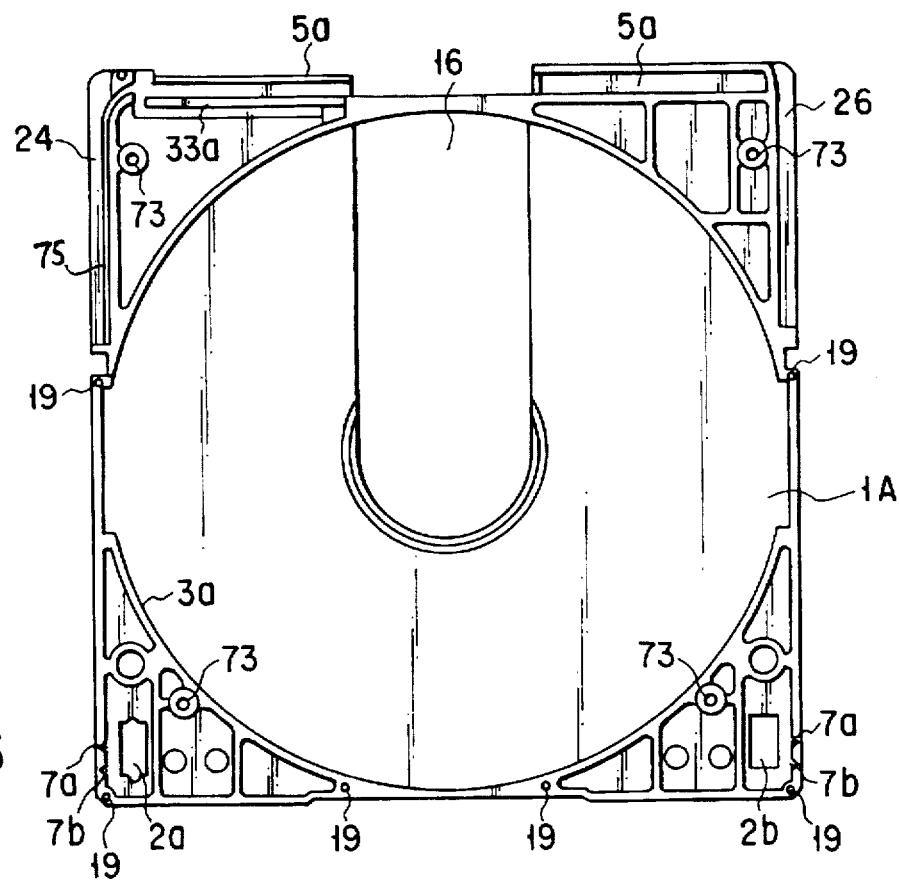

Referring to FIGS. 4 to 6, the first half case 1A has the opening portion 16. A shallow, rectangular recess 15 is formed in the surface of the first half case 1A, and the shutter 22 slides in this recess 15 and the opening portion 16 is formed therein. A side edge 15a adjacent to the opening portion 16 of the recess 15 serves as a stopper edge against which the shutter 22 abuts when the shutter is closed.

A side edge 16a of the opening portion 16, adjacent to the stopper edge 15a, is inclined toward the stopper edge 15a. For this reason, when the shutter 22 is closed, it smoothly reaches the stopper edge 15a without being caught by the side edge 16a.

Rectangular mounting holes (first and second mounting holes) 2a and 2b are formed at corner portions of a rear end portion of the first half case 1A. A projecting portion 91 of an operation piece 72 for write protect is slidably fitted into each of the mounting holes 2a and 2b from the back side of the half case 1A. Furthermore, at four corner portions of the half case 1A are formed insertion holes 73 into which fixing screws 95 are to be inserted.

A rib having a predetermined height, which extends along almost all the outer periphery of the case 1A, and a circular rib 3a defining a space for storing the optical disk 14, are formed integrally as one component on the backside of the half case 1A. A guide groove 5a in which the slider 6 is slidably fitted is formed on the back face of the half case 1A, and extends along the front edge of the case 1A. Two pair of V-shaped grooves (first engagement grooves) 7a and 7b in which claws 93 of elastic arms 92 of each of operation pieces 72a and 72b (described later) are selectively engaged, are formed on the inner surface of the rib which serves as both sidewalls of the rear end portion of the half case 1A. The V-shaped grooves 7a and 7b are formed at a fixed interval in the inserting direction of the disk cartridge, and arranged adjacent to each of the mounting holes 2a and 2b.

Figure 7:
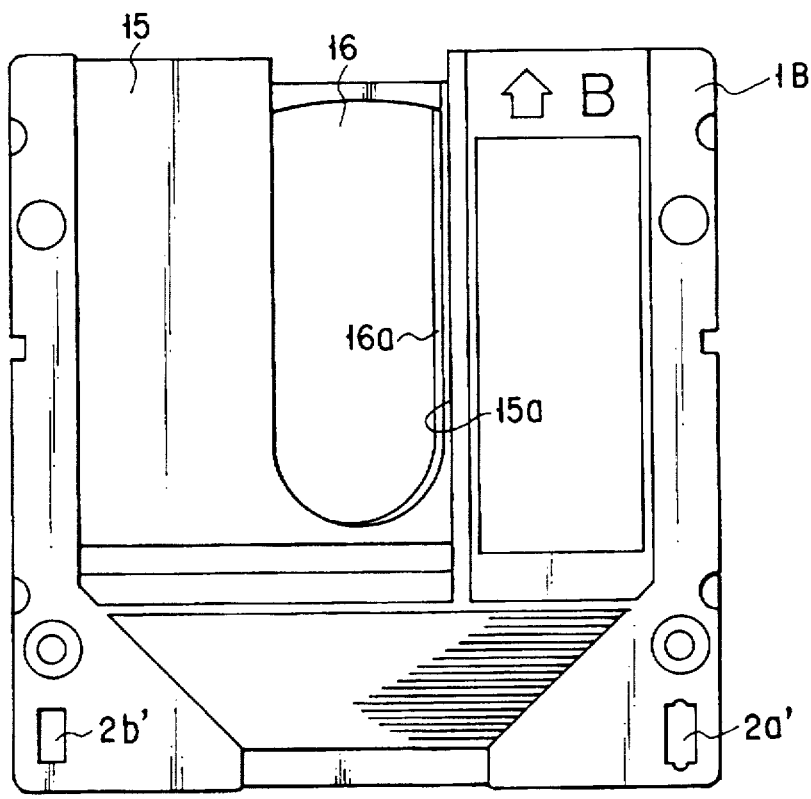
Figure 8:
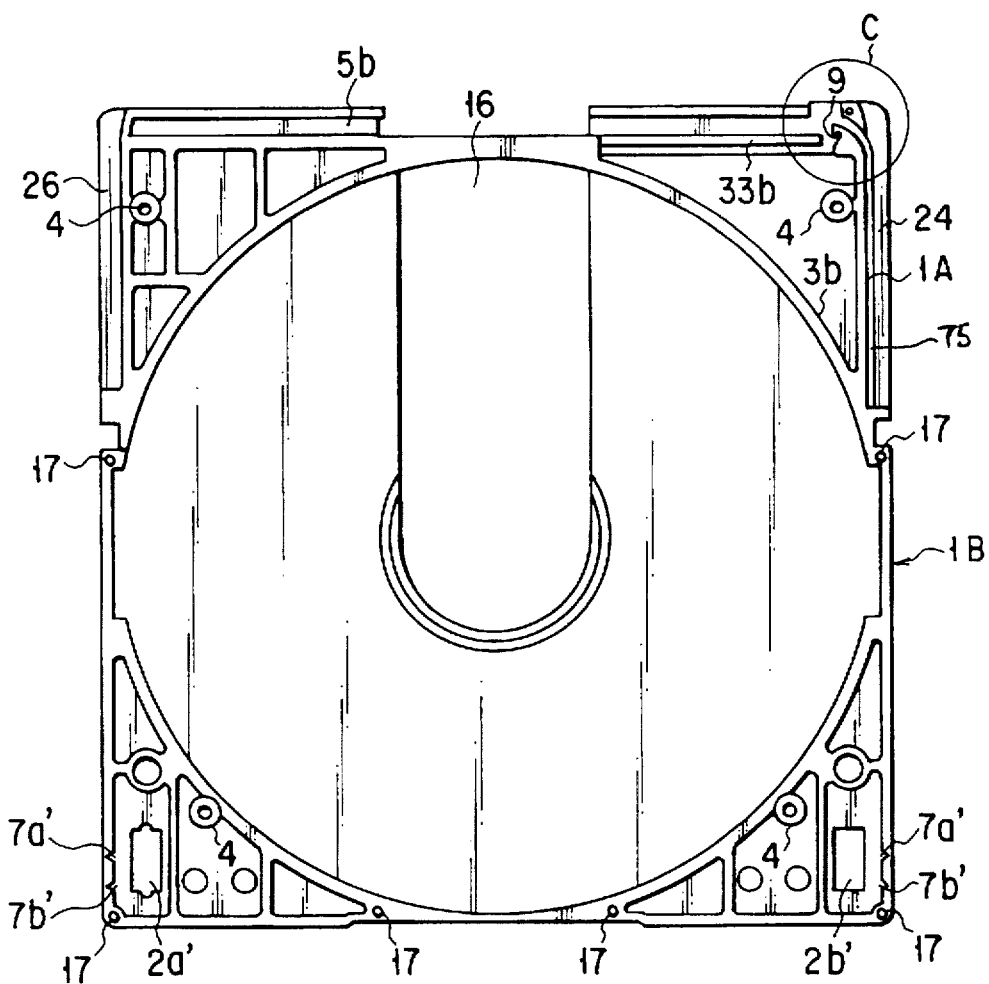

As shown in FIGS. 4, 7 and 8, the second half case 1B is substantially symmetrical with the first half case 1A. More specifically, a shallow, rectangular recess 15 including the opening portion 16, where the shutter 22 slides, is formed in the surface of the second half case 1B, and one side edge of the recess serves as a stopper edge 15a. A side edge 16a of the opening portion 16 adjacent to the stopper edge 15a is inclined toward the stopper edge 15a so that, when the shutter 22 is closed, the shutter 22 smoothly reaches the stopper edge 15a without being caught by the side edge 16a.

Rectangular mounting holes (second and fourth mounting holes) 2a' and 2b' are formed at corner portions of a rear end portion of the second half case 1B. A projecting portion 91 of the operating piece 72 for write protect is slidably fitted into each of the mounting holes 2a' and 2b' from the back of the half case 1B.

A rib having a predetermined height, which extends along almost all the outer periphery of the case 1B, and a circular rib 3a for constituting a space in which the optical disk 14 is housed, are formed integrally as one component on the backside of the half case 1B. A guide groove 5b for slidably fitting the slider 6 thereinto is formed on the back face of the half case 1B, and extends along the frond edge of the case 1B. A boss 4 having a hole into which a fixing screw 95 can be inserted is protruded from each of four corner portions of the inner surface of the half case 1B.

A plurality of fitting pins 17 stand on the rib of the half case 1B, especially between the bosses 4 and at both corner portions of the rear end portion. The rib of the first half case 1A has a plurality of holes 19 into which the pins 17 can be fitted.

Two pair of V-shaped grooves (second engagement grooves) 7a' and 7b' in which the claws 93 of elastic arms 92 of the operation pieces 72 are engaged, are formed on the inner surface of the rib which serves as both sidewalls of the rear end portion of the half case 1B. The V-shaped grooves 7a' and 7b' are formed at a fixed interval in the inserting direction of the disk cartridge, and arranged adjacent to each of the mounting holes 2a' and 2b'.

Figure 9:
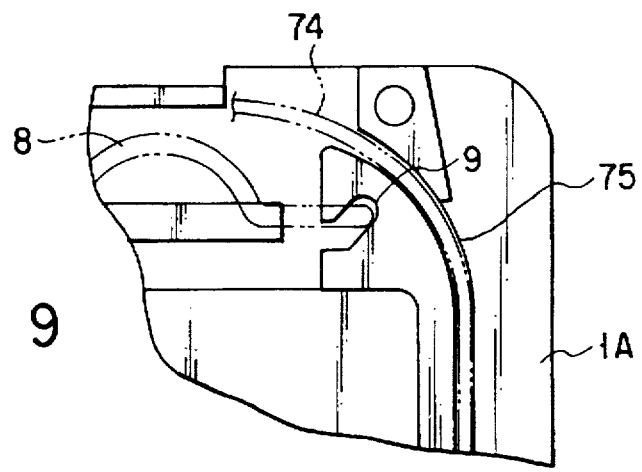

As shown in FIG. 9, a notch 9 in which one end of the torsion spring 8 is fitted, is formed in that front edge portion of the wall portion of the half case 1B which is located alongside the groove 24.

The first and second half cases A and B having the above constitution are jointed, with their inner surfaces facing each other, by screwing the fixing screws 95 through the inserting holes 73 of the first half case 1A into the screw holes formed in the bosses 4 of the second half case 1B. At the same time, the fitting pins 17 are elastically fitted into the holes 19 of the first half case 1A to prevent a gap from being caused between the first and second half cases in regions between the screwed portions.

As illustrated in FIGS. 4 and 10, the slider 6, torsion spring 8 serving as an urging member, and belt 28 are arranged in the front end portion of the case 12 constituted of first and second half cases 1A and 1B.

The torsion spring 8 includes, as shown in FIGS. 4, 10 and 11, a coil portion 8a and a pair of arms 8b and 8c extending in opposite directions from the coil portion 8a. The extend end of the arm 8b is bent at right angles and connected to one end of the slider 6, while the extended end of the arm 8c is also bent at right angles and engaged into the notch 9 serving as a fixing portion formed in the second half case 1B. The halfway portion of the arm 8c is formed as a curved portion 8d which is curved toward the front edge portion of the case 12.

The slider 6 is shaped like a rod and slidably fitted in the guide grooves 5a and 5b of the first and second half cases 1A and 1B. The slider 6 has a shutter mounting portion 6a to which the shutter 22 is fixed, and a pair of screw holes 32 for screwing the shutter is formed in the shutter mounting portion.

Figure 12:
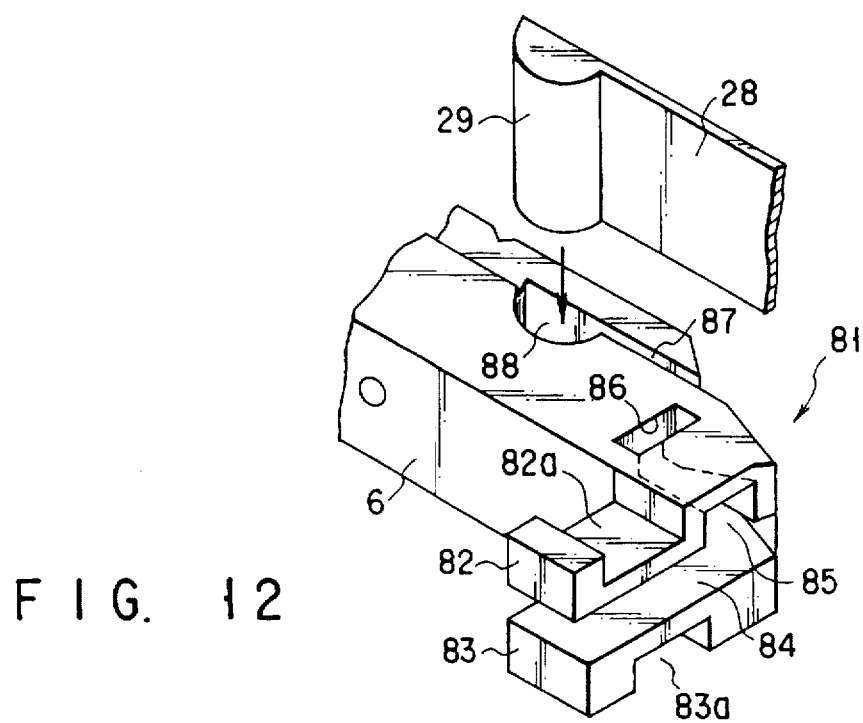
Figure 13:
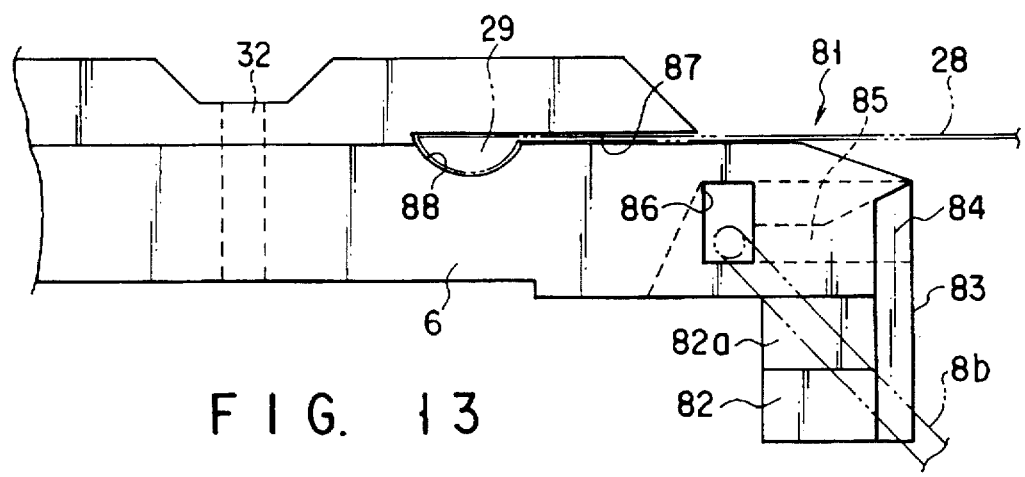
Figure 14:
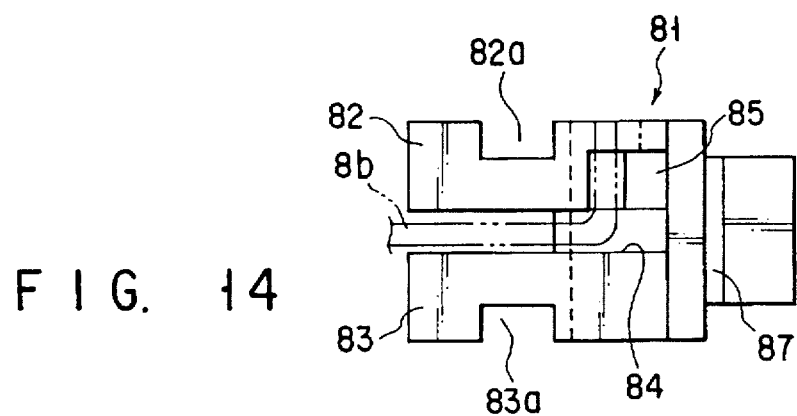

At one end of the slider 6 is formed a connecting portion 81 to which the end of the arm 8b of the torsion spring 8 is connected. As illustrated in FIGS. 12 to 14, the connecting portion 81 includes a pair of plate-like arms 82 and 83 extending from the slider 6 at right angles and arranged opposite to each other at a fixed interval. In these figures, the lower arm 83 has a width which is larger than that of the upper arm 82, and protrudes toward the torsion spring 8 more greatly than the upper arm 82 by a predetermined measure. The upper surface 84 of the lower arm 83 functions as a positioning portion for positioning the torsion spring 8 relative to the connecting portion 34 when the torsion spring is connected to the slider 6.

The connecting portion 81 has an insertion hole 85 extending into the slider 6 in its axial direction from a region between the arms 82 and 83 into the mounting portion 6a, and a stopper hole 86 serving as a stopper portion which extends from the end of the insertion hole 85 at right angles and is opened in the upper surface of the slider 6. Engagement recesses 82a and 83b are formed on the outer surfaces of the arms 82 and 83, respectively, and slidably engaged in guide ribs 33a and 33b standing along the guide grooves 5a and 5b on the inner surfaces of the half cases 1A and 1B.

As illustrated in FIGS. 4, 10, 12 and 13, a slit 87 is formed in an end portion of the slider 6 and adjacent to the connecting portion 81 such that it extends in the longitudinal direction of the slider, i.e., in the moving direction thereof. A semi-cylindrical holding recess 88 is formed at the end of the slit 87 and extends in a direction perpendicular to the moving direction of the slider. A semi-cylindrical projection 29, which corresponds to the holding recess 88, is formed at one end of the belt 28. The belt 28 is connected to the slider 6 by inserting one end of the belt into the slit 87 while the projection 29 is fitted into the holding recess 88.

The belt 28 is curved along the guide groove 24 from its middle portion, and the sliding pin 30 provided at the other end of the belt can be moved along the guide groove 24. Moreover, an engagement groove 75 is formed in the inner surface of each of the half cases 1A and 1b defining the guide groove 24 and extends along the groove 24, and both end portions of the belt 28 in its width direction are engaged in the grooves 75 and held in the groove 24.

Figure 15:
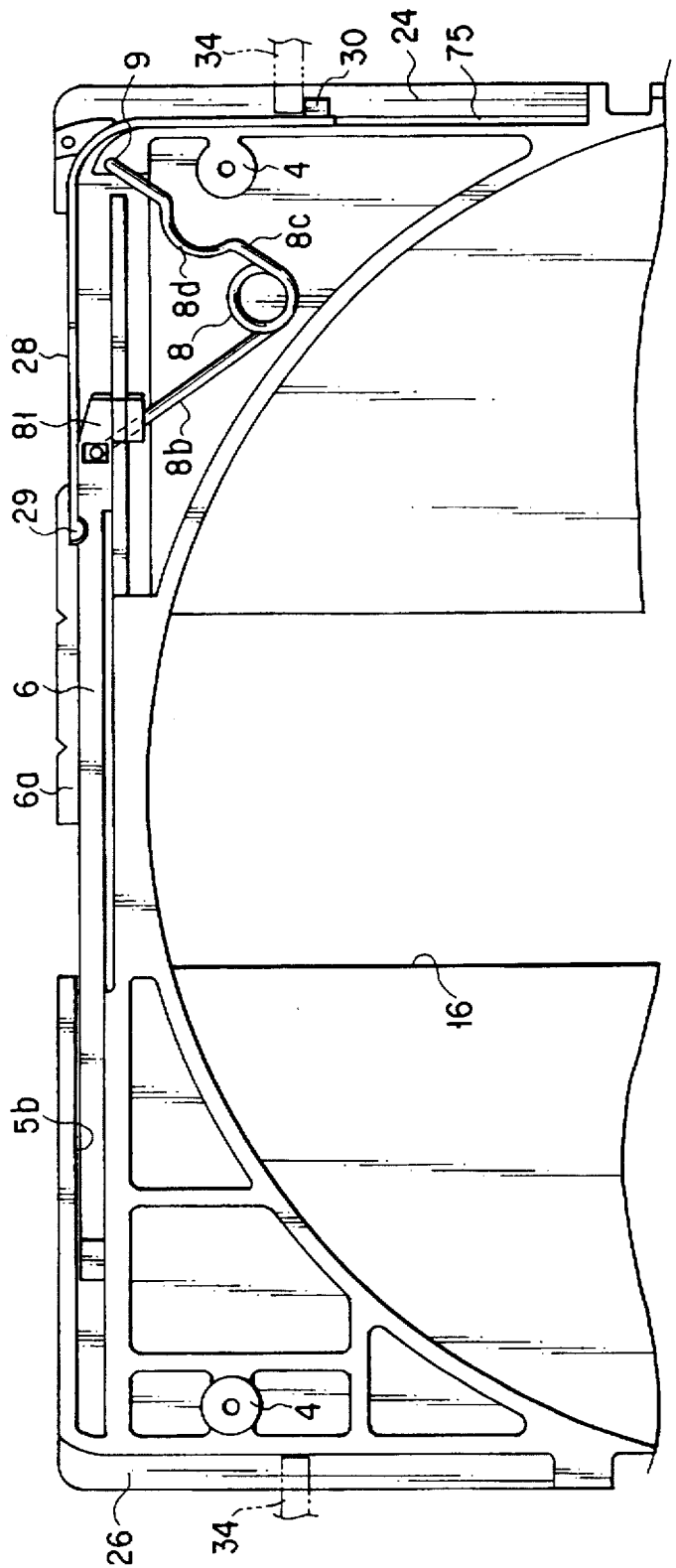

If the cartridge 10 whose shutter 22 is closed is inserted into an optical disk drive (which will be described later), an opening claw 34 of a shutter opening/closing mechanism provided in the optical disk drive, is inserted into the guide groove 24, as shown in FIG. 10. As the cartridge 10 is inserted in the direction of arrow A in FIG. 10, the sliding pin 30 of the belt 28 abuts the opening claw 34 and the belt 28 is moved in the direction of arrow B. The slider 6 is therefore, as shown in FIG. 15, pulled by the belt 28 and moved in the open direction against the urging force of the torsion spring 8.

As the slider 6 moves, the arm 8b of the torsion spring 8 moves and approaches the arm 8c thereof, and the arm 8c rotates toward the guide groove 24 about the notch 9. It is thus likely that the arm 8c will interfere with the boss 4 and the torsion spring will rise. Since, however, the arm 8c is provided with the curved portion 8d in a position corresponding to the boss 4, the arm 8c does not interfere with the boss 4, thereby preventing the torsion spring 8 from rising and being detached from the notch 9.

Figure 17:
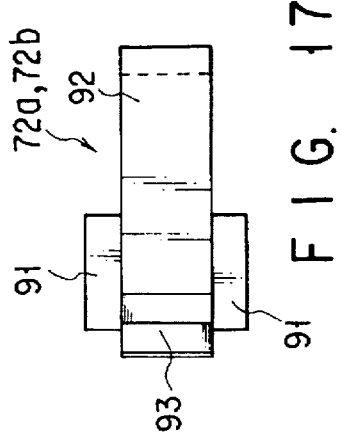
Figure 16:
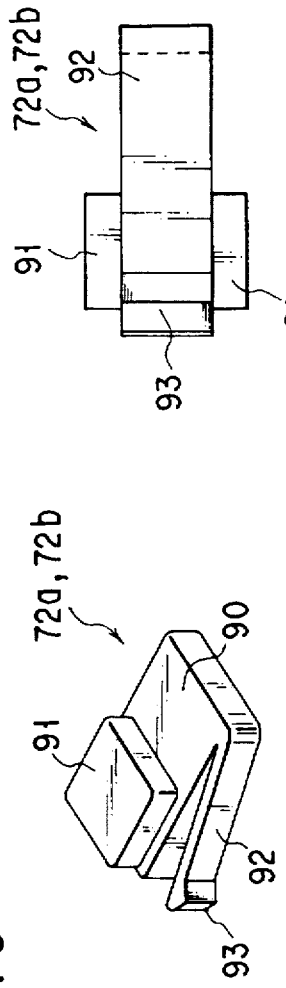

As shown in FIGS. 16 and 17, the operation pieces 72a and 72b each includes a flat, rectangular body 90, rectangular projections 91 projecting from both faces of the body, and an elastic arm 92 extending from the side of the body. The projections 91 are formed in such a size that they are slidably fitted into the mounting holes 2a, 2b, 2a' and 2b' of the first and second half cases 1A and 1B. At the end of the elastic arm 92 is formed a claw 93 for engaging in the V-shaped grooves of the case 12.

Figure 18:
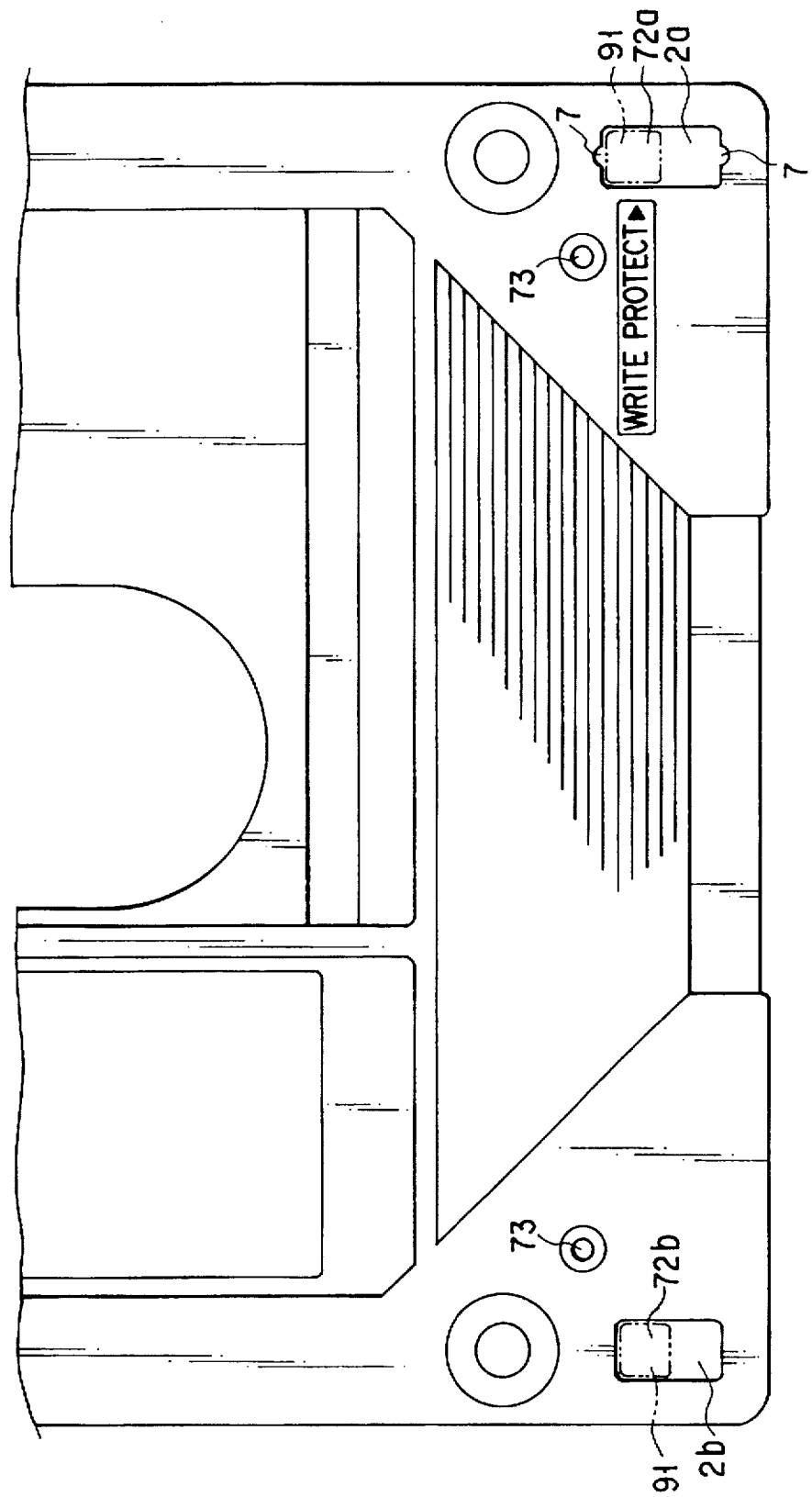
Figure 19:
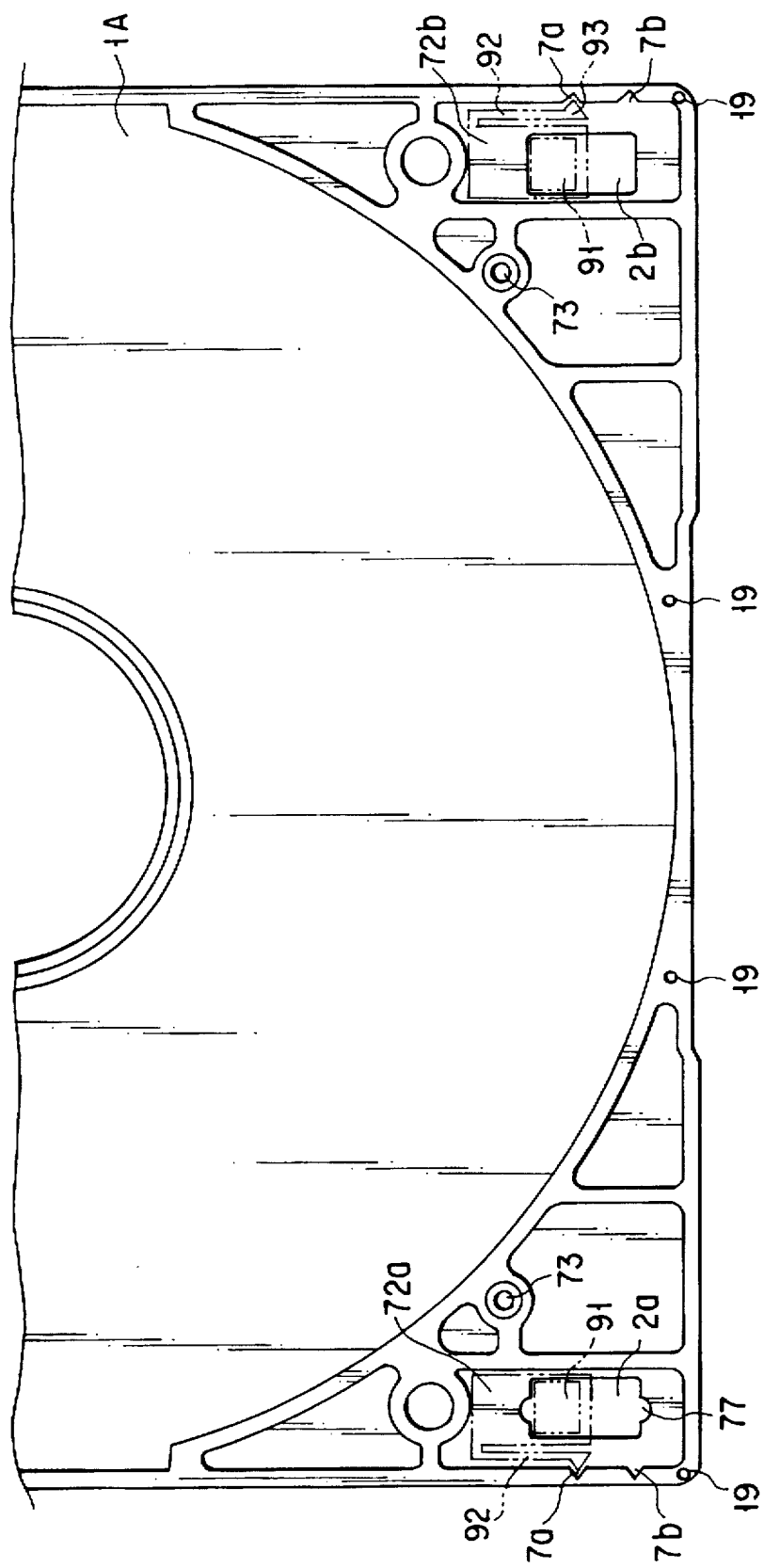

FIGS. 18 and 19 are enlarged views of the rear end portion of the first half case 1A in which the mounting holes 2a and 2b are formed. These mounting holes 2a and 2b are shaped like a rectangle the width of which is substantially equal to that of each projection 91 of the operation pieces 72a and 72b and the length of which is about twice as long as the projection 91. An arc notch 77 is formed so as to protrude outwardly from each end edge of the mounting hole 2a in its longitudinal direction.

One of the projections 91 of the operation piece 72a provided on the inner side of the half case 1A is slidably fitted into the mounting hole 2a, while one of the projections 91 of the operation piece 72b provided thereon is slidable fitted into the mounting hole 2b. The operation pieces 72a and 72b are guided by the mounting holes and, as shown in FIG. 19, can be moved between a write protect position where the projection 91 is located at the upper end of the mounting hole and a writable position where the projection 91 is located at the lower end of the mounting hole.

When the projections 91 are fitted into the mounting holes, the upper end faces of the projections are flush with the surface of the half case 1A. The operation pieces 72a and 72b can thus be moved through the projections 91 by operation from outside the half case 1A. Since the mounting hole 2a is provided with the notches 77, a gap is formed between the each end edge of the hole and the projection 91, and a user's nail or a pin-like member can be inserted in the gap, with the result that the operation piece 72a can easily be slid.

On the contrary, no notch is formed at the mounting hole 2b, therefore, it is difficult for a user to slide the operation piece 72b.

The elastic arms 92 of the operation pieces 72a and 72b are located opposite to the rib constituting the sidewall of the half case 1A, and the claws 93 of the elastic arms contact the inner surface of the rib. When the operation pieces 72a and 72b are moved to the write protect position, the claws 93 are elastically engaged the grooves 7a by elasticity of the elastic arms 92, and the operation pieces 72a and 72b are held in the write protect position.

As shown in FIG. 20, when the operation piece 72a or 72b is slid from the write protect position to the writable position, the claw 93 is detached from the groove 7a by deformation of the elastic arm 92, and rises on the inner surface of the rib. When the operation piece reaches the writable position, the claw 93 is engaged the groove 7b and the operation piece is held in the writable position.

Figure 21:
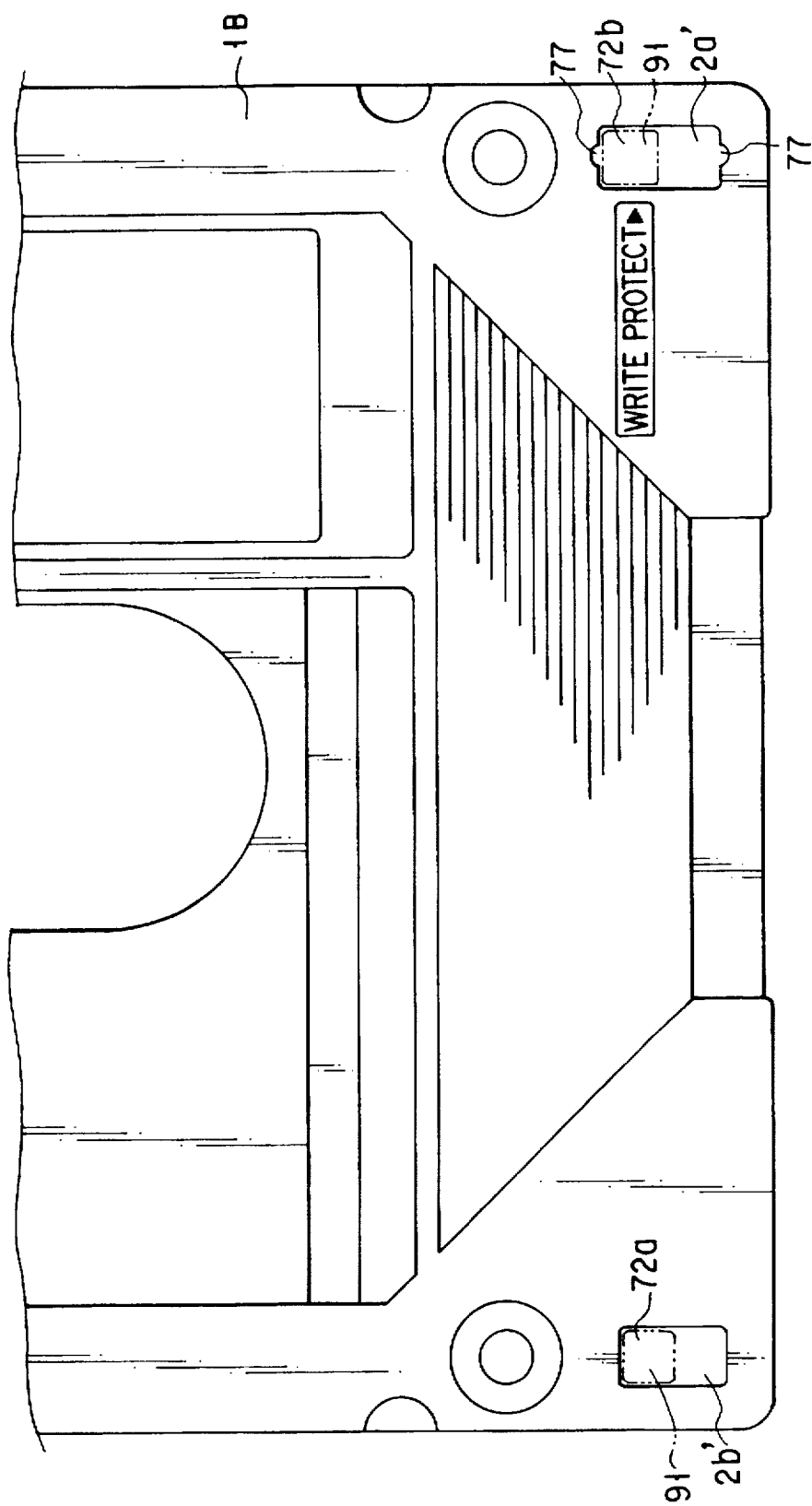
Figure 22:
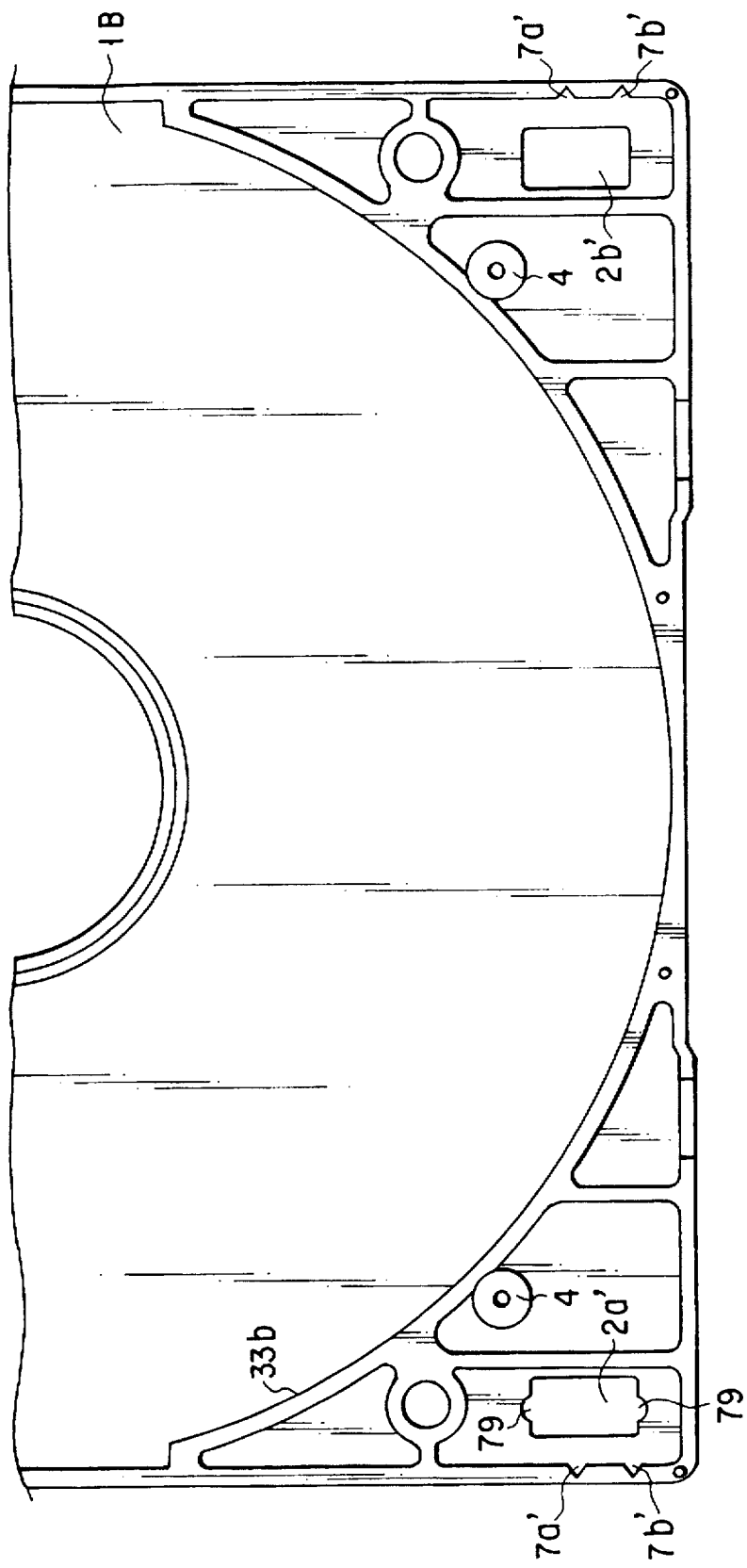

As illustrated in FIGS. 21 and 22, the two mounting holes 2a' and 2b' of the second half case 1B are each shaped like a rectangle the width of which is substantially equal to that of each projection 91 of the operation pieces 72a and 72b and which is about twice as long as the projection 91. An arc notch 77 is formed so as to protrude outwardly from each end edge of the mounting hole 2a' in its longitudinal direction.

When the second half case 1B is joined to the first half case 1A, the mounting holes 2a' and 2b' of the former case face those 2b and 2a of the latter case, respectively. Specifically, the mounting hole 2a' with the notches 77 faces the mounting hole 2b without any notch, while the mounting hole 2b' without any notch faces the mounting hole 2a with the notches 77.

The other projections 91 of the operation pieces 72a and 72b are slidably fitted into the mounting holes 2b' and 2a' of the second half case 1B, respectively. The upper end faces of these projections 91 are flush with the surface of the half case 1B. The operation pieces can thus be moved through the projections by operation from outside the half case 1B. Since the mounting hole 2a' is provided with the notches 77, a gap is formed between the end edge of the mounting hole 2a' and the projection 91 of the operation piece 72b, and a user's nail or a pin-like member is inserted into the gap, with the result that the operation piece 72b can easily be slid.

On the contrary, no notch is formed at the mounting hole 2b', therefore, it is difficult for a user to slide the operation piece 72a.

The V-shaped grooves 7a' and 7b' formed adjacent to the mounting holes 2a' and 2b' on the inner sidewall of the second half case 1B, are larger than those 7a and 7b of the first half case 1A. Thus, even if the grooves 7a and 7b of the first half case and those 7a' and 7b' of the second half case are offset from predetermined position due to manufacturing error, the grooves 7a and 7b securely overlap with the corresponding grooves 7a' and 7b', respectively, when the first and second half cases are joined to each other, and this aims at easily assembling the disk cartridge.

A method of assembling the disk cartridge 10 having the above constitution, will now be described.

As shown in FIG. 10, the slider 6 is set in the guide groove 5b of the second half case 1B. After that, as shown in FIG. 23A, the end portion of the arm 8b of the torsion spring 8 is brought into contact with the surface 84 or positioning portion of the slider 6 so as to position the end portion with respect to the inserting hole 85 of the slider. When, as shown in FIG. 23B, the end portion of the arm 8b reaches the end of the inserting hole 85, the arm 8b is rotated and its bent portion is engaged the stopping hole 86, as shown in FIG. 23C. Thus, the torsion spring 8 is connected to the slider 6 without coming out of the hole 85. Then, the end portion of the arm 8c is fitted into the notch 9 of the half case 1B, thus completing the attachment of the torsion spring 8.

As illustrated in FIGS. 10 and 13, one end portion of the belt 28, including the projection 29, is engaged in the slit 87 and holding recess 88 of the slider 6, thereby connecting the end portion to the slider 6. The other end portion of the belt 28 is attached to the second half case 1B while being engaged in the guide groove 75.

The two operation pieces 72a and 72b are mounted on the second half case 1B with their projections 91 fitted into the mounting holes 2a' and 2b', and the claws 93 of the elastic arms 92 of the operation pieces are engaged in the grooves 7a' and 7b'. The optical disk 14 is then housed within a disk storing region defined by the rib 3b.

After the slider 6, torsion spring 8, belt 28, operation pieces 72a and 72b and optical disk 14 are mounted in the second half case 1B, the first half case 1A is put on the case 1B from above, so that the slider 6 is fitted into the guide groove 5a, and the projections 91 of the operation pieces 72a and 72b are fitted into the mounting holes 2a and 2b, respectively. The plurality of pins 17 of the second half case 1B are inserted by pressure into the holes 19 of the first half case 1A, with the result that the first and second half cases are temporarily joined to each other.

Subsequently, the fixing screws 95 are inserted through the inserting holes 73 of the first half case 1A and screwed into the screw holes of the bosses 4 of the second half case 1B, thereby fixing the first and second half cases 1A and 1B to obtain the disk cartridge 10. Finally, the shutter 22 is fitted on the case 12 from the front edge side of the disk cartridge 10 and screwed to the slider 6, thus completing the assembly.

As shown in FIG. 24, an optical disk drive, into which the disk cartridge 10 having the above-described constitution is to be loaded, includes a rectangular housing 40, and the front wall 41 of the housing is provided with an insertion port 46 for the disk cartridge 10. The housing 40 includes a partition wall 42 arranged between the upper wall and the bottom wall 44 of the housing 40 and in parallel therewith. The partition wall 42 extends from the insertion port 46 to the rear wall of the housing 40. An opening 43 is formed in the central part of the partition wall 42 and communicates with its upper and lower spaces.

On the partition wall 42 is provided a cartridge holder 66 for guiding and holding the disk cartridge 10, which is inserted into the housing 40 through the insertion port 46 in a predetermined position. The holder 66 includes a pair of guide walls 70 (only one of which is shown) standing on the partition wall 42 and a pair of upper plates 67 (one of which is shown) extending inwardly from the upper edges of the guide walls 70 and in parallel with the partition wall 42. The guide walls 70 are separated from each other by a distance substantially equal to the width of the disk cartridge 10 and extend in the inserting direction A of the disk cartridge 10. Therefore, the cartridge 10 inserted through the insertion port 46 is positioned and guided in the horizontal direction by the guide walls 70 and done in the vertical direction by the partition wall 42 and upper plates 67.

The opening claw 34 (shown in FIGS. 10 and 15), which is a constituent of the shutter opening/closing mechanism, is provided at the end portion of each of the guide walls 70 alongside the insertion port 46, and protrudes into the cartridge holder 66. If the disk cartridge 10 is inserted into the cartridge holder 66, the opening claws 34 are engaged into the guide grooves 24 and 26, and one of the claws abuts the projection (sliding pin) 30 of the belt 28 to open the shutter 22.

A spindle motor 58 for rotating the optical disk 14 in the disk cartridge inserted in a predetermined position and an optical head 51 for recording information on the optical disk and reproducing and erasing information therefrom are provided under the partition 42 and opposite to the opening 43.

The spindle motor 58 includes a turntable 61 fixed on the upper end of a spindle shaft 58a, and the optical disk 14 is mounted on the turntable 61 by magnetically adsorbing the hub 18 of the disk 14 onto the turntable 61.

The spindle motor 58 rises and falls between a drive position where the turntable 61 supports the optical disk 14 and a retreat position where the table 61 retreats from a moving path of the disk cartridge 10, by means of a rise/fall mechanism 60 provided on the bottom wall 44 of the housing 40.

The optical head 51 includes a carriage 50, an objective 52 supported by the carriage 50 through an elastic supporter 54, a laser light beam source (not shown) provided on the carriage 50, and a focusing/tracking actuator (not shown). The carriage 50 is supported movably in the radial direction of the inserted optical disk 14 by a pair of parallel guide rods 56 attached onto the bottom wall 44. By driving the carriage 50 by a linear motor (not shown), the objective 52 is moved to a position opposite to a desired track of the optical disk 14.

An operation of the optical disk so constructed will now be described.

Referring to FIG. 24, when the disk cartridge 10 is inserted from the insertion port 46 into the housing 40 in the inserting direction A, both side thereof move along the guide walls 70 and the upper and lower faces thereof move along the upper wall of the cartridge holder 66 and the partition 42, respectively. While the cartridge 10 is moving, the sliding pin 30 of the cartridge 10 abuts against the opening claw 34 protruded from one of the guide walls 70, and only the case 12 moves in the inserting direction A, with the result that the shutter 22 is pulled through the belt 28 and moved toward the opening position. The disk cartridge 10 is inserted to the loading position against the urging force of a compression spring 89 in the cartridge holder 66 and passes over the optical head 51 while the shutter 22 is completely opened. When the cartridge 10 reaches the loading position, it contacts the end of the cartridge holder 66 and locked by a lock mechanism (not shown).

After that, the spindle motor 58 is moved from the retreat position to the drive position by the rise/fall mechanism 60, and the turntable 61 of the spindle motor is engaged with the hub 18 of the optical disk 14 in the disk cartridge 10. The optical disk 14 is thus supported on the turntable 61. If the spindle motor 58a is driven, the optical disk 14 can be rotated at a predetermined speed.

Since the objective 52 of the optical head 51 faces the optical disk 14 through the opening portion 16 of the cartridge 10, the disk can be accessed. If, therefore, a laser beam is emitted from the objective 52 while the optical disk 14 is rotating, information processing such as recording and reproduction can be performed for the optical disk.

The disk drive includes a write sensor (not shown) for sensing the operation pieces 72a and 72b of the disk cartridge 10. If the sensor detects that the operation piece is set in the write protect position, information is inhibited from being written to the optical disk 14.

To eject the cartridge 10 from the disk drive upon completion of desired information processing, the spindle motor 58 is lowered from the drive position to the retreat position by the mechanism 60 and the turntable 61 is detached from the optical disk 14. When the disk cartridge 10 is unlocked by the lock mechanism, it is pushed from the loading position toward the insertion port 46 by the compression spring 89. The sliding pin 30 removes from the opening pin 34, and the shutter 22 of the cartridge 10 is then moved to the closing position by the torsion spring 8 in the case 12.

If the disk cartridge 10 is inserted upside down into the disk drive to use the reverse thereof, the shutter 22 is opened and closed to execute information processing for the reverse through the same operation as described above.

According to the disk cartridge having the above-described construction, the torsion spring 8, slider 6, belt 28, operation piece 72, etc. are suitable for automatic assembly, so that the disk cartridge can be easily assembled.

More specifically, since the slider 6 has a positioning section for positioning the distal end of the torsion spring 8 with respect to the inserting hole 85 at the time of assembly, i.e., the wall 84, and a stopping hole 86 for holding the distal end of the inserted torsion spring, if the torsion spring has only to be inserted into the inserting hole 85 with the distal end of the torsion spring in contact with the positioning section of the slider, the torsion spring can be easily connected to the slider, so that assembly can be performed automatically.

The slider 6 includes a pair of arms 82 and 83 between which one end portion 8b of the torsion spring 8 is inserted. Since these arms 82 and 83 serve as guide portions for preventing the torsion spring 8 from rising in a direction opposite to the urging direction when the shutter 22 is opened, the spring can reliably be prevented from being detached from the slider, and the slider can be operated smoothly.

Since the torsion spring 8 has the curved portion 8d on its halfway section, it does not contact the fixed portion or boss 4 when it moves in a direction opposite to the urging direction in accordance with the opening of the shutter. Therefore, the shutter can be opened reliably and smoothly.

The operation pieces 72a and 72b for selectively inhibiting and allowing a write to the optical disk are provided for the respective sides of the optical disk 14 on/from which information can be recorded/reproduced. Upon switching the operation piece, only the operation piece 72a can be operated from the side A of the disk cartridge (from the surface of the first half case 1A), whereas only the piece 72b can be operated from the side B thereof (from the surface of the second half case 1B). More specifically, notches 77 are formed in only one (2a) of the paired mounting holes 2a and 2b formed in the surface of the first half case 1A, and a user's nail or the like is inserted in a gap between the notches 77 and operation piece 72a, thereby enabling the operation piece 72a to be switched. Similarly, other notches 77 are formed in only one (2a') of the paired mounting holes 2a' and 2b' formed in the second half case 1B, a user's nail or the like is inserted in a gap between the notches 77 and operation piece 72b, thereby enabling the operation piece 72b to be switched.

Consequently, a user is able to easily recognize that which operation piece corresponds to the side of the optical disk 14 without confusion, thereby preventing the user from making an error in operation. Since, furthermore, the switching position of the operation pieces 72a and 72b on the user side and that of the operation pieces 72a and 72b on the disk drive side can be made coincident with each other, the sensor of the disk drive is convertible.

The operation pieces 72a and 72b have projections 91 fitted into the mounting holes of the half cases and elastic arms with claws 93 elastically engaged in the grooves 7a and 7b formed in the inner side walls of the half cases. Therefore, the operation pieces can be held in the predetermined positions of the half cases when the disk cartridge is assemble. It is thus possible to automatically mount the operation pieces on the half cases.

Since the V-shaped grooves formed in the second half case is larger than those formed in the first half case, the claw of the elastic arm of each operation piece can easily be engaged in the V-shaped grooves of the second half case, thus enabling automatic mounting of the operation pieces to the half case.

Since the slit 87 and recess 88 are formed in the slider 6 and the projection 29 corresponding to the recess is formed at an end portion of the belt 28, the belt and slider can be connected to each other by simply inserting the end of the belt including the projection 29 into the slit and recess, thus allowing automatic assembly.

The present invention is not limited to the above embodiment, but various changes and modifications can be made without departing from the scope of the invention.

For example, as shown in FIGS. 25A to 25C, the arms 82 and 83, which are provided at the connecting portion 81 of the slider 6, and opposite to each other with a gap therebetween, can be formed so as to have a projection length L which is as long as possible along the longitudinal direction of the slider 6. Thus, these arms reliably prevent the torsion spring from rising when it moves in a direction opposite to the urging force thereof as the slider 6 moves.

Figure 26A:
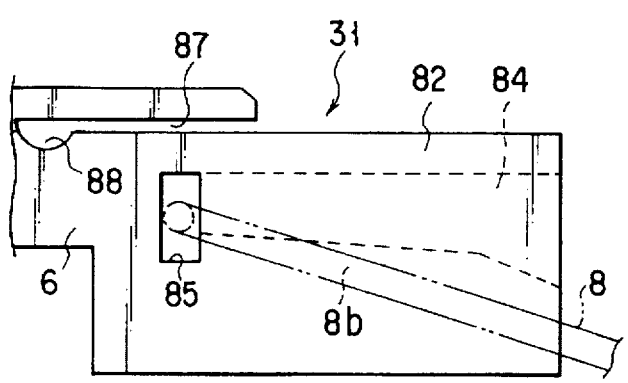
FIGS. 26A to 26C are plan, side and front views showing another modification of the connecting portion of the slider.
Figure 26C:
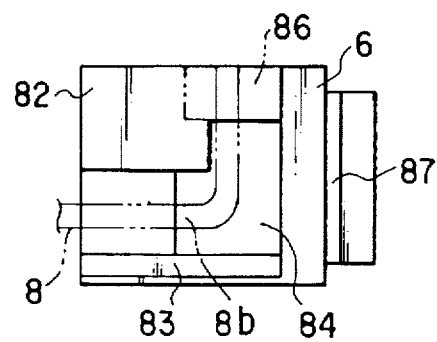
Figure 26B:
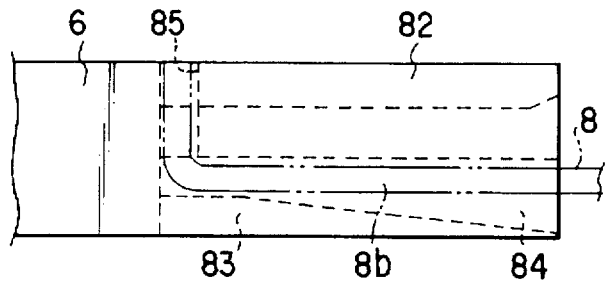

As illustrated in FIGS. 26A to 26C, if the above projection length L is as long as possible and the upper wall of the slider can be formed longer, the end portion of the torsion spring 8 can be held more reliably and the spring can be prevented from rising.

Figure 27A:
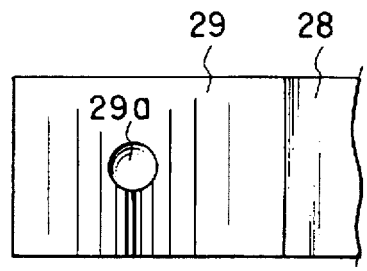
FIG. 27A is a side view showing a modification of the connecting portion of the belt.
Figure 27B:
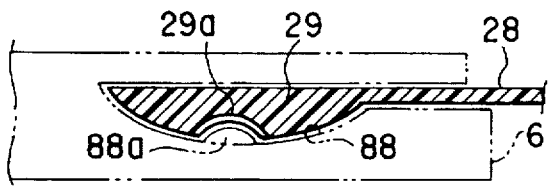
FIG. 27B is a cross-sectional view of the connecting portion shown in FIG. 27A.

As shown in FIGS. 27A and 27B, a projection 88a can be formed in the recess 88 of the slider 6, a recess 29a corresponding to the projection 88a can be formed in the projection 29 of the belt 28, and the projection 88a can be fitted into the recess 29a when the projection 29 is fitted into the recess 88. In this case, the connection strength between the slider 6 and belt 28 is improved to reliably prevent the belt from being detached therefrom.

Figure 28:
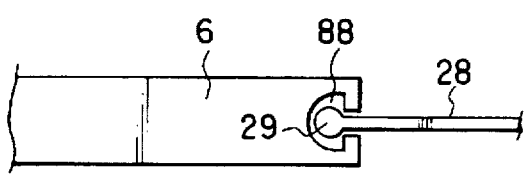
FIG. 28 is a plan view showing another modification of the connecting portion of the belt.

As illustrated in FIG. 28, the recess 88 of the slider 6 may be formed like an arc, and the projection 29 of the belt 28 can be formed spherically. The projection 29 can thus be fitted into the recess 88.

Figure 29:
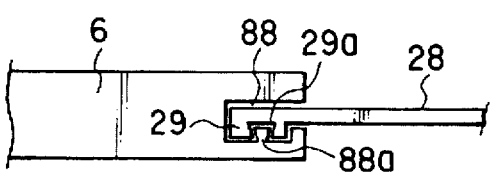
FIG. 29 is a plan view showing still another modification of the connecting portion of the belt.

As shown in FIG. 29, a wedged projection 88a may be formed in the recess 88 of the slider 6, and a wedged recess 29a can be formed in the projection 29 at one end of the belt 28. When the slider and belt are connected, the projection 29 can be fitted into the recess 88, and the projection 88a can be fitted into the recess 29a.

Figure 30:
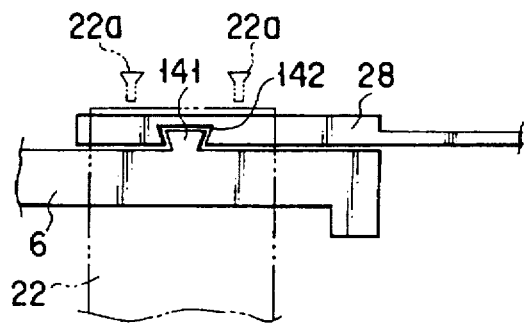
FIG. 30 is a plan view showing yet another modification of the connecting portion of the belt.

As shown in FIG. 30, a wedged projection 141 can be formed on the outer surface of the slider 6, while a wedged recess 142 can be formed on the inner surface of the end portion of the belt 28. The belt can be connected to the slider by fitting the projection 141 into the recess 142, and this connecting portion can be fixed to the slider 6 by fixing screws 22a together with the shutter 22.

What is claimed is:

1. A disk cartridge comprising:

a case containing an optical disk and designed to be inserted into an optical disk drive, the case including an opening portion for exposing part of the optical disk;

a shutter slidably attached to the case, for opening and closing the opening portion;

a slider movably provided on one side of the case and connected to the shutter;

an urging member connected to the slider, for urging the slider in a direction in which the shutter is closed; and a belt having an end portion connected to the slider and slidably mounted on the case, for pulling the slider against an urging force of the urging member to open the shutter in accordance with an operation of inserting the case into the optical disk drive;

the slider having a slit extending in a moving direction of the slider and an engagement recess communicating with the slit and extending substantially perpendicularly to the moving direction of the slider, and the end portion of the belt being fitted in the slit and having a projection engaged with the engagement recess.

2. A disk cartridge according to claim 1, wherein said slider includes a connecting portion to which an end portion of the urging member is connected, and the connecting portion has an inserting hole into which an end portion of the urging member is inserted, an engagement portion engaged with the end portion of the urging member inserted into the inserting hole, for inhibiting the urging member from coming out of the inserting hole, and a positioning portion for positioning the end portion of the urging member in the inserting hole when the end portion of the urging member is inserted into the inserting hole.

3. A disk cartridge according to claim 2, wherein said slider includes a guide portion for inhibiting the urging member from rising when the urging member moves in a direction opposite to the urging force thereof in accordance with an opening operation of shutter.

4. A disk cartridge according to claim 2, wherein said connecting portion further includes a pair of arms extending from the slider and arranged opposite to each other at a predetermined interval, and the end portion of the urging member is inserted into the inserting hole through a space between the arms.

5. A disk cartridge according to claim 1, wherein said belt has a recess formed in the projection, and the slider has a holding projection projecting into the engagement recess and engaged with the recess of the projection to prevent the projection from coming out of the engagement recess.

6. A disk cartridge according to claim 1, wherein the slider includes a connecting portion to which an end portion of the urging member is connected, and the connecting portion has an inserting hole into which the end portion of the urging member is inserted, an engagement portion engaged with the end portion of the urging member inserted into the inserting hole, for inhibiting the urging member from coming out of the inserting hole, and a positioning portion for positioning the end portion of the urging member in the inserting hole when the end portion of the urging member is inserted into the inserting hole.

7. A disk cartridge according to claim 1, wherein the case has a stopper portion for abutting the shutter when the shutter is closed, and an inclined surface for defining an edge of the opening portion and guiding the shutter to the stopper portion.

* * * * *